United States Patent [19]

Melamud et al.

[11] Patent Number: 5,793,293
[45] Date of Patent: Aug. 11, 1998

[54] TEMPERATURE SENSING SYSTEM FOR OVER-HEAT DETECTION

[75] Inventors: Lucy Melamud, Pepper Pike; Richard P. Heggs, Dublin; Mark E. O'Loughlin, Galloway, all of Ohio

[73] Assignee: Furon Company, Aurora, Ohio

[21] Appl. No.: 649,871

[22] Filed: May 13, 1996

[51] Int. Cl.$^6$ .................................................. G08B 17/06
[52] U.S. Cl. .......................... 340/596; 340/511; 340/512; 340/514; 340/516
[58] Field of Search ..................... 340/596, 511, 340/512, 514, 516

[56] References Cited

U.S. PATENT DOCUMENTS 3,774,184  11/1973  Scarelli ........................ 340/596
5,185,594  2/1993  De Church ................... 340/596

Primary Examiner—Glen Swann
Attorney, Agent, or Firm—Fay, Sharpe, Beall, Fagan, Minnich & McKee

[57] ABSTRACT

A temperature sensing system for over-heat detection includes a temperature sensing cable, interface unit and termination unit. The interface unit is configured to issue interrogation, communication and power signals to the termination unit through the temperature sensing cable. During normal operation issuance of the interrogation signal results in no reflection pulses, as the signal is dissipated through the termination resistance in the termination unit. When an over-heat, short circuit or open circuit condition exists, a reflected pulse is detected by the interface unit and this information is used to determine the type and location of the condition. The interface unit is also configured to supply power to the termination unit which in turn is stored in the termination unit to power its operations, including setting of the resistor values. The termination unit is used as an instrument of calibration in the subject system.

20 Claims, 10 Drawing Sheets

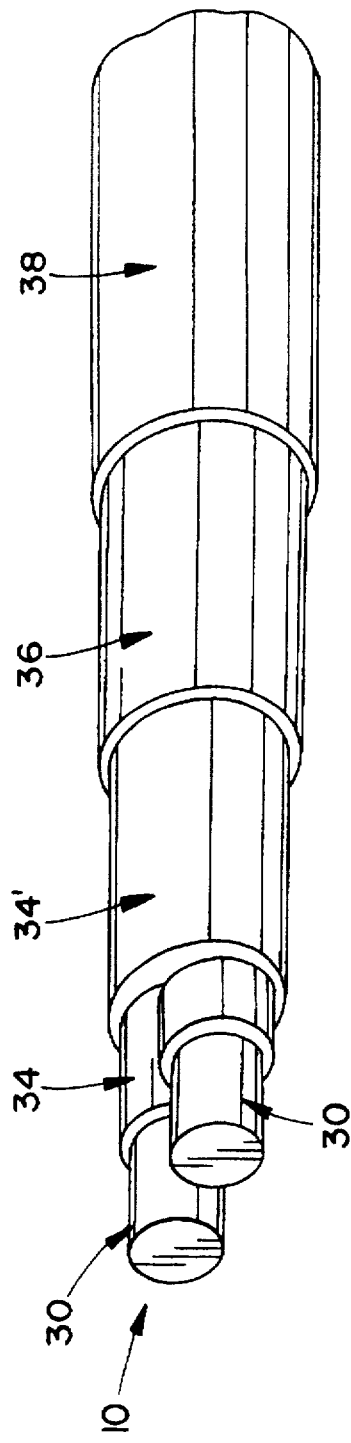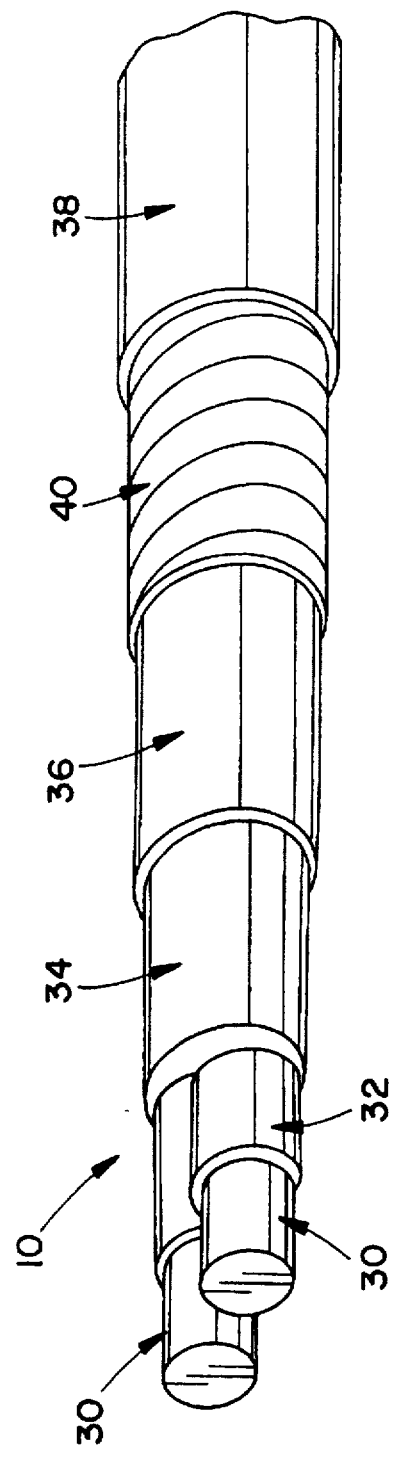
FIG. 2B
FIG. 2C

| SALT | WIRE | CORROSION RATE AT 3 CYCLES PER WEEK (mpy) | CORROSION RATE AT THE END OF 30 DAY CONTINUOUS EXPOSURE TO ELEVATED TEMPERATURE (mpy) | | CORROSION RATE INCREASE |
| --- | --- | --- | --- | --- | --- |
| | | | T = 99° C | T = 65° C | |
| INTERMEDIATE | 27% Ni/Cu | 3.99 | 10.59 | | 2.7 |
| INTERMEDIATE | Ni | 1.1 | 9.95 | | 9 |
| INTERMEDIATE | 10% Ag/Cu | 0.17 | 0.17 | | 1 |
| ORDINARY | 27% Ni/Cu | 4.98 | | 9.05 | 1.8 |
| ORDINARY | Ni | 4.43 | | 8.14 | 1.8 |
| ORDINARY | 10% Ag/Cu | 0.2 | | 0.20 | 1 |

FIG. 2E

| SALT | PRIMARY JACKET | SECONDARY JACKET | PROCESS TEMPERATURE (°F) | PROCESS SPEED (ft/min) |
|---|---|---|---|---|
| ORDINARY | HDPE | PVDF | 448, 544 | 61, 61 |
| INTERMEDIATE | HDPE | PVDF | 448, 544 | 61, 61 |
| INTERMEDIATE | PP | PVDF | 441, 544 | 89, 61 |
| INTERMEDIATE | PVDF | | 544 | 61 |

FIG. 2F

NORMAL TERMINATED

OPEN CIRCUIT

SHORT CIRCUIT

HEATING EVENT 5,793,293

1

TEMPERATURE SENSING SYSTEM FOR OVER-HEAT DETECTION

BACKGROUND OF THE INVENTION

The present invention relates to the remote temperature sensing arts and more particularly to a resettable temperature sensing system capable of detecting the existence of high temperature conditions.

It is known in the art of high temperature protection to utilize electrical temperature sensing cables having two conductors separated by insulation, wherein a short circuit is generated when a high temperature condition exists at some point along the length of the cable.

Various implementations have been used to produce a drop in resistance between conductors of a temperature sensing cable, for example, a semiconductor device designed for such operation is placed between spaced intervals along the cable and becomes conductive when a high temperature condition exists. Another known cable deploys eutectic salt between the conductors. At the eutectic temperature, the compound melts and its resistance falls, thereby allowing current flow between the conductors. When the temperature falls, the compound solidifies and the resistance returns to its original high value.

A desirable feature of a high temperature sensing system which employs an elongated temperature sensing cable is to not only its capability to detect the existence of high temperature conditions within a general area, but to be able to detect a particular location along the cable where the high temperature condition exists. This is especially desirable when the elongated cables are intended to be used in remote difficult to monitor areas.

Systems employing cables using the above noted eutectic salts have attempted to determine the location of an over-heated area by various methods.

However, the accuracy of the determined location of the hot spot with increased conductivity using the above known methods and systems is generally poor due to a variety of factors, including that the resistance of the conductors vary with changes in ambient temperature, degradation of the salts in a cable over time, and a general shifting of the characteristics of the cable which are not accurately monitored and accounted for in the operation of the system. Additionally, inaccurate readings will also exist thus leading to erroneous determination of the location of a high temperature zone.

It is an aim of the present invention, therefore, to overcome the above limitations by providing an improved method and apparatus to determine the distance from one end of the high temperature sensing cable to the point of the decreased resistance established between conductors at elevated temperatures with greater accuracy than has previously been provided by existing resistance measurements.

It is a further aim of the present invention to provide a temperature sensing cable having linear heat detection capabilities, of extended length and flexibility such that the system of the present invention can be used in a greater variety of sensing locations. The linear heat detector cable also having dual heat sensing capabilities.

It is yet a further object of the present invention to provide an apparatus and method for maintaining a high degree of accuracy in detection of high temperature by using an interface unit which communicates with a termination unit through the temperature sensing cable, where both units include on-board intelligence. The termination unit being powered through signals provided from the interface unit and being used to ensure proper automated calibration of the system.

SUMMARY OF THE INVENTION

In accordance with one aspect of the present invention, a system for sensing high temperature conditions which uses an elongated resettable temperature sensing cable interconnecting an interface unit and termination unit, is provided. The interface unit and termination unit are configured to communicate with each other through the temperature sensing cable, in order to provide and maintain automated calibration.

In accordance with one aspect of the present invention, the temperature sensing cable is comprised of a twisted pair of copper wires with a fiberglass covering saturated with eutectic salt forming an eutectic salt core. A primary polymer jacket is extruded over the core to act as a moisture barrier. When necessary a secondary polymer jacket is extruded to provide added resistance to chemicals, flame retardancy, etc. Further, when excessive humidity is anticipated, a laminated aluminum tape is included in the design over or in place of the primary polymer jacket prior to extrusion of the secondary polymer jacket.

In accordance with another aspect of the present invention, the interface unit is constructed to generate interrogation, communication and power signals. The termination unit is capable of differentiating between the interrogation, communication and power signals. Energy from the power signal is stored in the supercapacitor and used to operate the termination unit.

In another aspect of the subject invention, the termination unit is used to automatically calibrate the system such that any changes in the characteristics of the temperature sensing cable, are being taken into account and operation of the system is adjusted.

Still further advantages will be apparent to those of ordinary skill in the art upon a reading and understanding of the following detailed description of the preferred embodiment.

BRIEF DESCRIPTION OF THE DRAWINGS

The invention may be embodied in various steps and arrangements of steps in various components and arrangements of components. The drawings are for purposes of illustrating a preferred embodiment and are not to be construed as limiting the invention.

FIG. 2B discloses a perspective view of another embodiment of the resettable temperature sensing cable with a second eutectic core and with selected components cut away to illustrate the overall assembly;

FIG. 2C illustrates a perspective view of another embodiment of resettable temperature sensing cable with an aluminum tape layer and with selected components cut away to illustrate the overall assembly;

FIG. 2E is a table of test data relating to different eutectic salts and conductors;

FIG. 2F is a table of various components used in the construction of a cable and associated characteristics;

DETAILED DESCRIPTION OF THE PREFERRED EMBODIMENT

Figure 1:
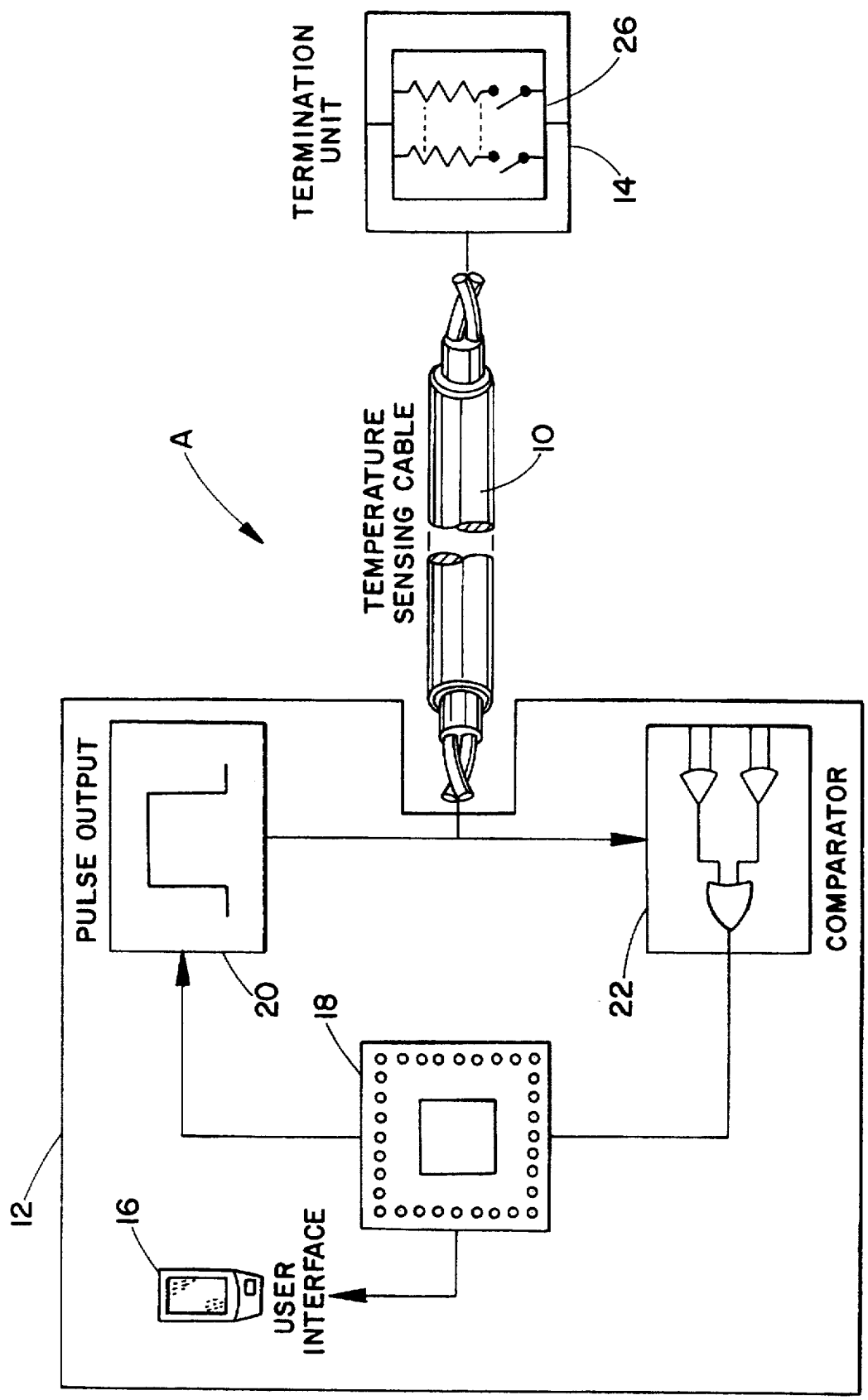
FIG. 1 is a block diagram of the temperature sensing system according to the present invention.

FIG. 1 illustrates a temperature sensing system A according to the subject invention, configured of three major components including a temperature sensing cable 10, an interface unit 12 and a termination unit 14. The system is designed to detect, locate and notify of high temperature conditions within the sensing area of temperature sensing cable 10. This is a proactive system which provides early detection and warning of over-heat for the prevention of fires or other damage caused due to high temperatures, wherein neither smoke or flames are needed to trigger operation. Temperature sensing system A is configured such that temperature changes exceeding a predetermined threshold at any point along temperature sensing cable 10 are detected and the location passed to an operator or user.

Interface unit 12 includes, as its major components, a user interface 16, a microprocessor (CPU) 18, pulse generation circuit 20 and comparator circuit 22.

Operation of cable is based upon phase transition of the eutectic salt. In a solid state the salt acts as an insulator, but becomes conductive upon melting. The temperature sensing cable construction utilizes the salts ability to change from an insulating to a conductive state as a function of temperature. During an over-heat condition the salt is rendered to a conductive state and insulation resistance between the conductors decline. A benefit of the phase change materials such as eutectic salt arises from the reversibility of the phase transitions. Normal operation of the system is restored as soon as the eutectic solidifies thereby returning the sensor to a supervisory role. The existence of false alarms are decreased as only heat above the salt melting point will be detected. Further, no intervention by an operator is required to reset the cable as it will automatically return to a standby alert state once the salt has resolidified. The electronics of the system, however, requires a reset command in order to return to normal operation. By requiring the reset command, care is taken not to miss an over-heat that does not produce a fire.

Temperature sensing system A implements time domain reflectometry (TDR) for heat detection and sensor monitoring. Generally, microprocessor 18 supplies pulse instructions to pulse generation circuit 20 to generate an interrogation, communication or power pulse, which is then sent to an input of temperature sensing cable 10. Under normal operating conditions, when an interrogation pulse is sent by interface unit 12 through temperature sensing cable 10, reflection of the pulse does not occur. Rather, all power is dissipated through the termination unit 14 due to an appropriate selection of termination resistance 26 during an initial calibration procedure.

Pulse reflection will occur when heat from a supervised environment induces a phase transition within temperature sensing cable 10, resulting in increased conductivity. The reflected pulse propagates back from the region with molten salt, through temperature sensing cable 10 to comparator section 22, where the signal is interpreted according to its magnitude. The output of comparator section 22 is sent to microprocessor 18, where the signal is further processed, and results of the processing are thereafter output to user interface 16.

Figure 2A:
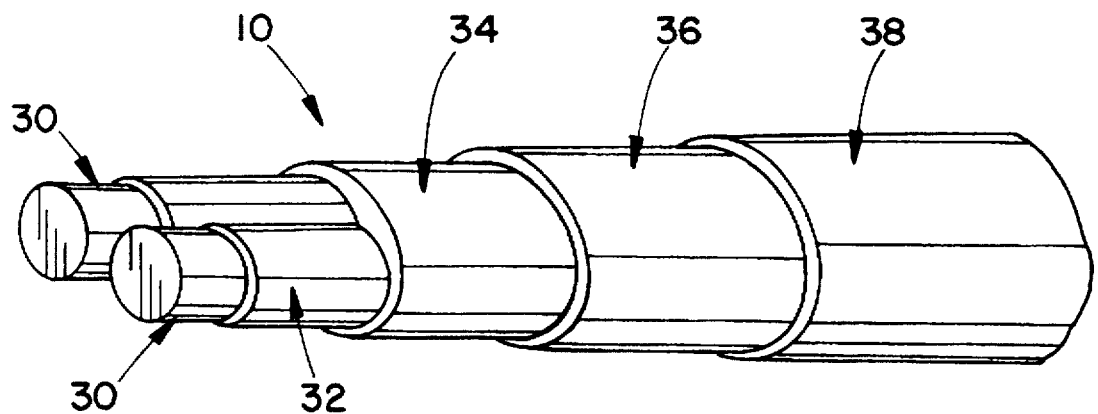
FIG. 2A depicts a perspective view of the resettable temperature sensing cable with selected components cut away to illustrate the overall assembly.

With more particular attention to temperature sensing cable 10, as illustrated in FIG. 2A, cable 10 is constructed with a pair of twisted conductors 30, insulated with a thin layer of porous material such as fiberglass 32, which is impregnated with eutectic salt. Salt selection is based on the salts conductivity in a molten state, reversibility of the melting/crystallization process, and values of melting point and heat of fusion.

FIG. 2E is a table of corrosion test data relating to different eutectic salts and conductors evaluated for the subject embodiment. It is to be appreciated, however, that eutectic salts having other characteristics may also be used depending upon the intended uses of the temperature sensing system A.

Conductors 30 illustrated in FIG. 2A are a twisted pair of 10% Ag plated Cu wires covered in served fiberglass 32, which is saturated with eutectic salt so as to form a solid salt core layer 34, which acts as an additional layer of insulation between conductors 30. Due to the corrosive nature of salts, especially in a molten state, selection of a corrosion resistant material is desired. After conductors formed of various materials were tested it was determined that the 10% Ag plated Cu wires were desirable based on both the conductors neutrality to polar eutectics and its signal propagation characteristics. Components used in construction of a cable and associated characteristics of the components are shown in FIG. 2F.

Figure 2D:
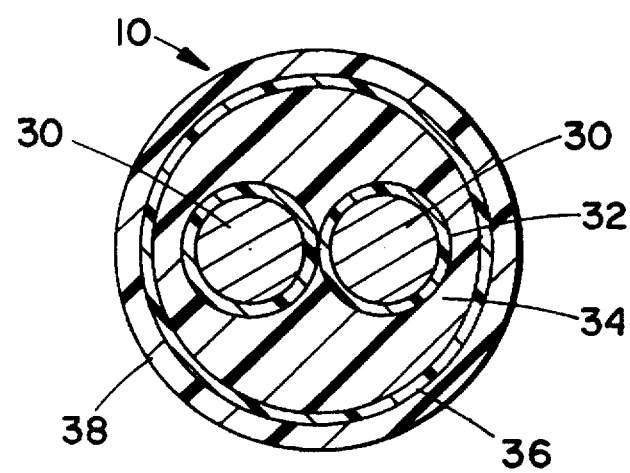
FIG. 2D is a cross section view of the heat detection cable of FIG. 2A.

Returning attention to FIG. 2A, a polymer or primary jacket 36 is extruded over salt core 34, in an in-line manufacturing operation. Use of polymer jacket 36 protects the hydroscopic eutectic salts 34 from prolonged exposure to environmental air and humidity which could otherwise result in early degradation. Selection of the jacket material was governed by the goal of achieving long term barrier protection against moisture. The use of an extrudable material provides high flexibility in the design of the temperature sensing cable and eliminates a problem of corrosion, which would otherwise exist should, for example, the jacket be made of a metal material. It is noted that depending upon various thermal, chemical and wear criteria different polymer jackets for cable exterior protection can be used. FIG. 2D illustrates the temperature sensing cable 10 of FIG. 2A in cross section.

When necessary, a polymer jacket 38, is extruded over polymer jacket 36. The primary jacket 36 acting to serve as a moisture barrier and the secondary jacket 38 to provide added resistance to chemicals, rigidity, flame retardancy, etc.

The polymer jackets 36, 38 have been successfully extruded at temperatures exceeding the eutectic salts melting and decomposition temperatures. In one embodiment the inventors manufactured cables with HDPE followed by the PVDF, as described in FIG. 2F. A temperature sensing cable 10 of this type, reported favorable test results obtained at high heat and humidity. Such a cable 10 also showed good sensor resettability on repeated over-heating occurring during a thermal cycling test. Cables were heated above a trigger temperature and subsequently cooled to room temperature approximately 250 times. After these experiments, the cables triggered in the desired temperature range. Using the resettable features of cable 10, makes high temperature sensing system A suitable for bi-annual inspection, which is normally required for fire protection equipment.

Use of different eutectic salts allows for different temperature trigger set points, including in the range of 60° C. to 300° C.

Turning attention to FIG. 2B, a temperature sensing cable 10 may be manufactured with a plurality of salt core layers. Particularly, as illustrated in FIG. 2B, in addition to salt core 34 a second salt core 34' is manufactured on top of the outer surface of salt core 34. Cores 34, 34' are two separate, distinct layers which have not been fused or otherwise mixed together. Using a cable 10 of this type, allows for a dual temperature sensing system.

With attention to FIG. 2C, a laminated aluminum tape 40 is included in the design prior to extrusion of secondary jacket 38. The laminated aluminum tape may be cigarette wrapped or wound and can be used in addition to or instead of primary jacket 36 when temperature sensing system A is anticipated to be used in environments having excessive humidity.

It is known that the majority of salts will undergo significant volume expansion upon melting. Therefore, it is desirable to select a containment system that will not burst as the salts liquify. The present design accommodates for the increased volume of eutectic salt while in a molten state. The polymer enclosure provides a high coefficient of expansion and elasticity which is needed to accommodate for repeated phase transitions.

It is desirable that temperature sensing cable 10 is positioned in proximity of a supervised object so that both radiation and convection will facilitate the heat transfer.

Figure 3:
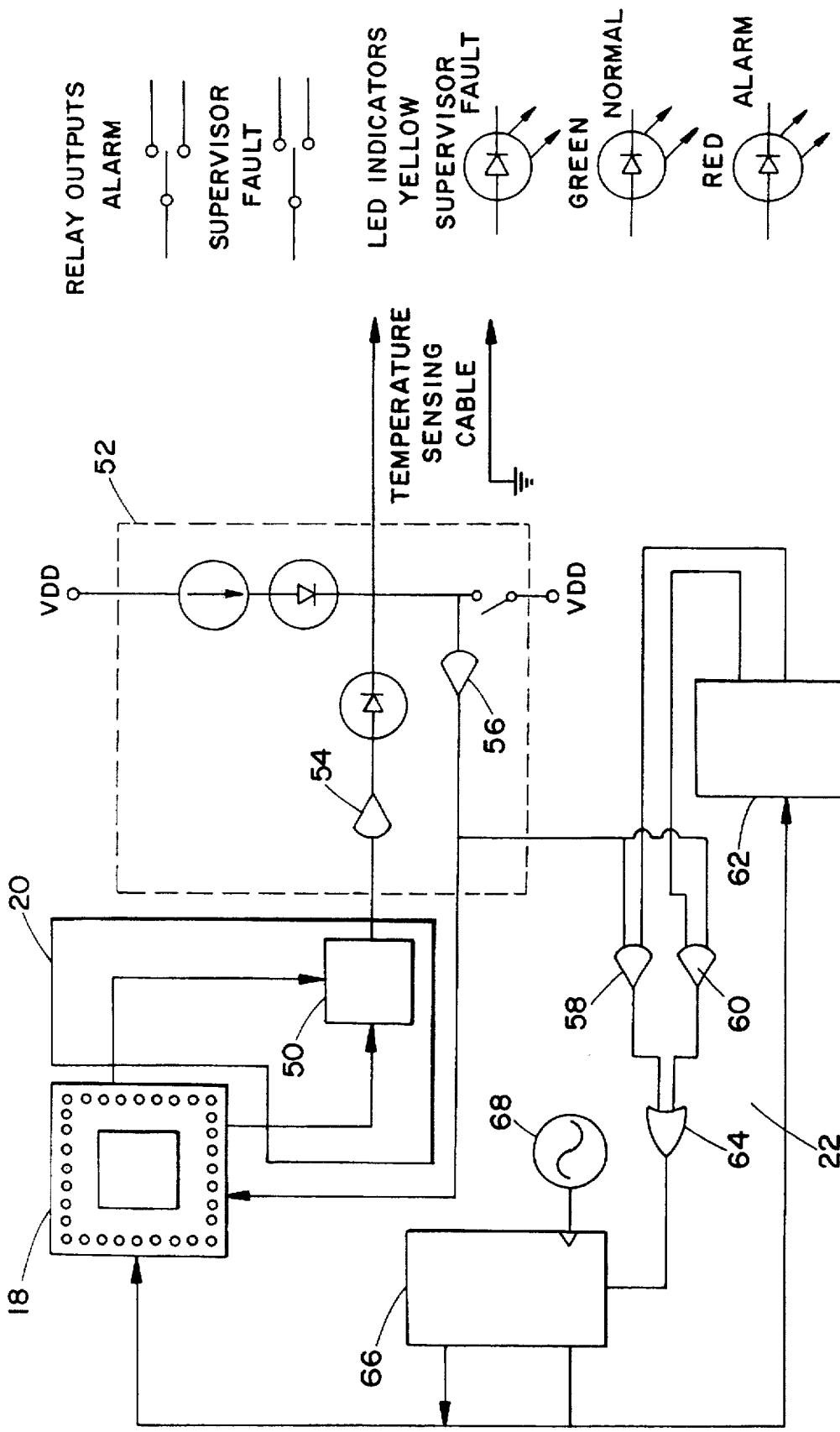
FIG. 3 is a more detailed view of the interface unit according to the subject invention.

Turning attention to interface unit 12 illustrated it more detail in FIG. 3, this component is used to monitor and interpret system conditions, communicate the system conditions to the outside world and provide interrogation, communication and power signals to termination unit 14, through temperature sensing cable 10.

Interface unit 12 uses time domain reflectometry (TDR) to monitor system operation such as detection and location of the occurrence of events along temperature sensing cable 10. Operation of interface unit 12 is controlled by microprocessor 18 which among other elements includes an on-board memory, serial port communications, timers, analog to digital converters, and operating programs which are resident in the on-board memory.

Serial port communication, is used to communicate with termination unit 14, and can be utilized for digital status information exchange with the control systems of the applications the temperature sensing system A is being used to monitor. For example, the serial port communications can be used to interface with a fire control panel or other type of installation control. The timer circuit of microprocessor 18 is used to program pulse widths provided to the temperature sensing cable 10 as well as to control other system functions. Further, the analog to digital converters of microprocessor 18 are used for DC voltage level readings during continuity checks as well as termination unit communication.

With further attention to FIG. 3, microprocessor 18 generates pulse output signals which are supplied to multiplexer 50 of pulse output generator 20. The signals generated based on the pulse output signals from microprocessor 18 include interrogation, communication and power signals, which are sent from multiplexer 50 to temperature sensing cable 10 via cable interface 52.

Cable interface 52 includes high speed buffer amplifiers 54 and 56 as its main sense/receive components. The high speed buffers 54, 56 allow for high frequency signals, such as the interrogation pulse, to be sent with more power than microprocessor 18 is able to independently produce. Additionally, buffer amplifiers 54 and 56 provide protection for other interface circuits not capable of handling the amount of power required to drive power and other signals onto temperature sensing cable 10.

A reflected pulse returns through temperature sensing cable 10, through buffer 56 to comparator circuit 22 which functions to determine the type of reflected information that has been received. Comparator circuit 22 includes high speed comparators 58 and 60 which have reference values provided by dual digital to analog converter 62. The outputs of comparators 58 and 60 feed an OR gate 64 which in turn supplies its output to 12-bit counter 66 operating with a 80 MHz clock 68. The output of 12-bit counter 66 is then fed to microprocessor 18 which processes this information to determine the location of a high temperature condition.

High speed 12-bit counter 66 is used to determine the intervals between the applied pulse and reflected waveform. In the present embodiment counter 66 is operated using a clock doubling scheme for an effective clock speed of 160 MHz, which allows 12-bit counter 66 to resolve distances along the temperature sensing cable 10 to within 1.5 feet.

With further attention to interface unit 12, user interface 16 includes a display, keyboard and serial port. In the present embodiment the display is a two line 16 character LCD display, which is directly interfaced to microprocessor 18 through a parallel bus with system condition information being detailed on the LCD display. The keyboard is capable of full numeric data entry and menu driven software is displayed during user keypad input. Embedded LED indicators provide high visibility system status information which serve as a second display of system status. Normal, fault, and alarm conditions are reported by green, yellow and red LEDs respectively. The system is also capable of external serial port communications.

Figure 4:
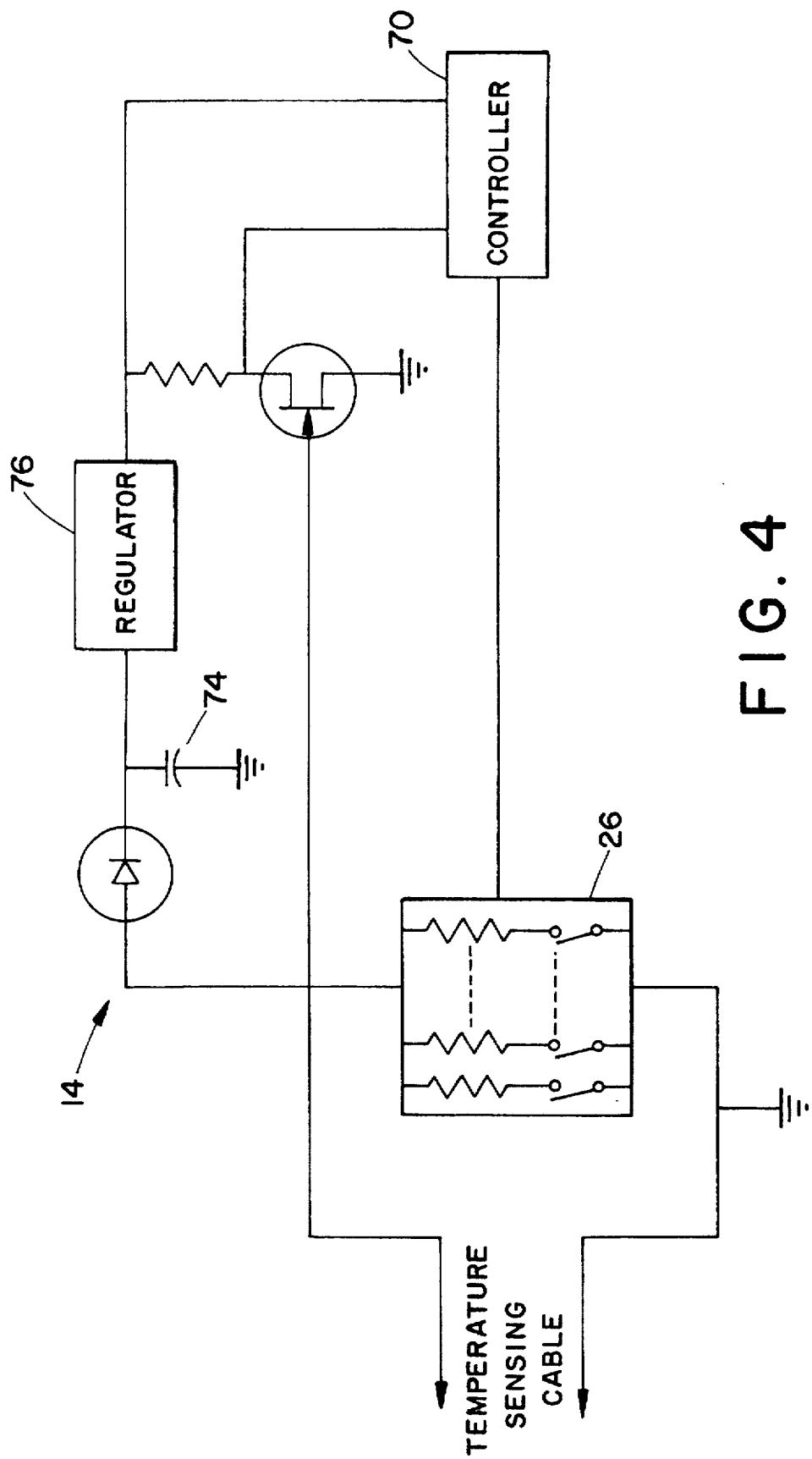
FIG. 4 is a more detailed view of the termination unit according to the subject invention.

Turning attention to the termination unit 14 of FIG. 4, the components include its own on-board intelligence in the form of controller 70, provides termination resistance 26, communicates with interface unit 12, and is capable of performing self-testing and system calibrations.

The interface unit 12 and termination unit 14 are in a master-slave communication relationship with the termination unit 14 being the slave device. Communications between termination unit 14 and interface unit 12 are accomplished over the temperature sensing cable 10 in a yes/no manner. The communication link allows the termination resistance 26 to be set according to the instructions of the interface unit 12. The self-test capability allows termination unit 14 to include a loop back communications test and a relay operation test. Controller 70 includes on-chip memory and is capable of receiving and executing the basic operations necessary to control termination unit operation, including communications protocol, the self-test programs and selection of termination resistance values.

In the present embodiment, the termination resistance 26 is set by a bank of six relays, which operate a resistor switching network comprised of four resistors and an open/short condition. This network allows for open, short, or impedance matched settings to be applied to the end of temperature sensing cable 10.

Communication with termination unit 14 is initiated from interface unit 12 by applying a pulse greater than 3 ms wide.

Any pulse less than 3 ms in width is ignored by the termination unit. When a communication pulse is received, controller 70 assumes a start bit was received and begins to listen for instructions from interface unit 12. Communications involve the interface unit 12 sending specific instructions that require a yes/no response from termination unit 14. A "yes" response from termination unit 14 is signaled by a short circuit applied to temperature sensing cable 10 for a predetermined period of time.

The interface unit 12 detects the "yes" response by application of DC current to temperature sensing cable 10 and monitoring the voltage level. Negative responses detected by the interface unit 12 is detected as a time-out from termination unit 14. Typical instructions sent to the termination unit 14 include opening or closing relays to set a termination resistance value, or an open or short condition.

The termination unit 14 according to the subject embodiment, consumes 150 mA of current supplied by a 12VDC bias from interface unit 12, wherein the minimum voltage required to operate termination unit 14 is 8 volts. Power is supplied from the interface unit 12 and is used to charge super-capacitor 74. The termination unit uses the charge on super-capacitor 74 to power operation through regulator 76 for operation during interrogation and for communications with the interface unit 12. The size of super-capacitor 74 is selected such that it is capable of powering termination unit 14 for approximately 5 minutes on a full charge.

As previously mentioned, under normal conditions, pulse reflection does not occur, rather all power is dissipated through the terminating resistance 26 in termination unit 14. Pulse reflection, however, does occur when heat from the supervised environment induces a phase transition in the temperature sensing cable 10 causing reduction in impedance. This reflected pulse is interpreted according to its magnitude and is reported to the main control panel via contact closures.

Particularly, when a reflected pulse is of a size so as to cross a preset threshold value of comparators 58 or 60 a logic "high" signal is issued. When the high signal is received by logic OR gate 64, it produces an output which stops 12-bit counter 66. This functioning occurs when either one or both of the thresholds of comparators 58 or 60 are crossed. At the beginning of each interrogation pulse, counter 66 is set to zero and thereafter records the time interval from issuance of an interrogation pulse until the counter 66 is stopped. The microprocessor 18 receives the time measurement from counter 66 and uses this information to calculate the location of cable discontinuity. When diagnostics are completed, an appropriate LED indicator is illuminated and relay contacts are closed.

Pulse reflection is interpreted according to its magnitude and reported to a main control panel through the contact closures. Negative reflection, or crossing the threshold of the lower comparator 60, indicates an over-heat or short circuit. DC voltage is applied to differentiate a short circuit from over-heating, since higher current is required to maintain constant voltage in the case of the short circuit. Positive reflection, which occurs when the threshold value in the upper comparator 58 is crossed, can only be caused by an open circuit. Location of the over-heat condition is determined by using the estimated signal propagation velocity in the cable and time measurements sent to microprocessor 18 from counter 66.

Operation reliability is enhanced and maintenance of temperature sensing system A is simplified by supplying intelligence to termination unit 14 through use of controller 70. By including the on-board intelligence of controller 70, termination unit 14 is able to perform a variety of duties including automated calibration of system A. Calibration allows the matching of cable impedance, the setting of proper voltage threshold values for triggering requirements, and verification of cable length. Daily checks by termination unit 14 of a baseline window established during calibration is performed to account for any significant changes. It is noted that the hydroscopic nature of eutectic salts makes humidity detrimental to proper operation. The effects of humidity, though smaller in magnitude, is indistinguishable to the electronics of temperature sensing system A from an over-heat condition. Therefore, moisture ingression is monitored by checking the baseline voltage. The baseline can also be affected by aging and by slow increases in ambient temperatures. Therefore, daily checking of the baseline prevents the system from issuing false alarms. Further, system integrity is checked hourly through the communications between interface unit 12 and termination unit 14.

Figure 5:
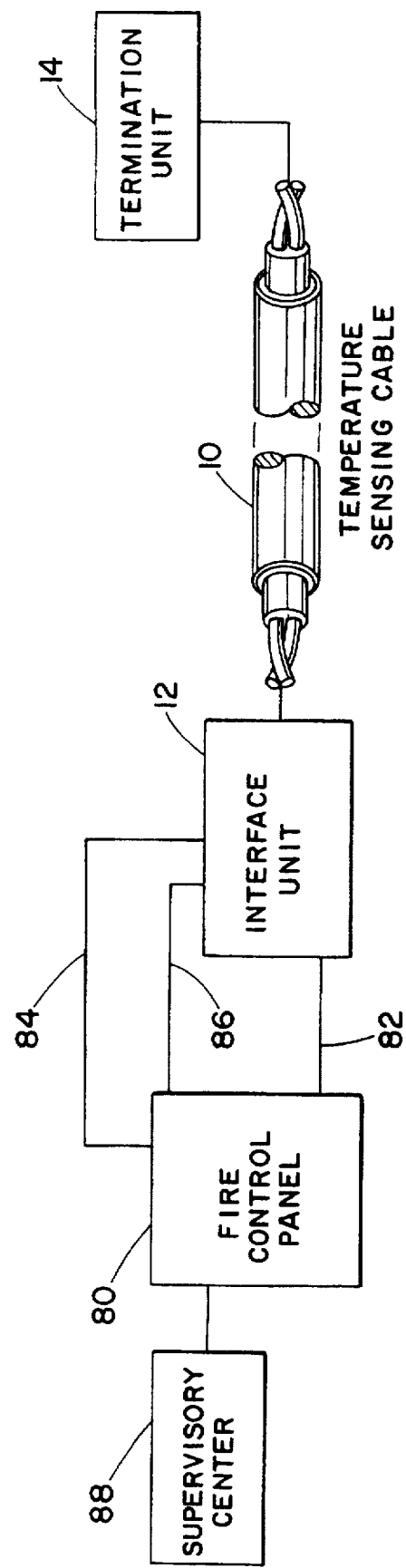
FIG. 5 illustrates a temperature sensing system according to the subject invention in a typical installation arrangement.

The temperature sensing system A of the subject invention is used in a variety of monitoring installations including a typical system shown in FIG. 5. In this figure the previously discussed arrangement of interconnections between interface unit 12, cable 10 and termination unit 14 are the same. However, system installation further illustrates that interface unit 12 is interconnected to a fire control panel 80 through a power connection 82, alarm contacts 84 and fault contacts 86. It is further shown that the fire control panel is then interconnected to an overall supervisory center 88 where an operator monitoring the control systems may be located. FIG. 5 emphasizes that the temperature sensing system A of the subject invention can be used in remote locations removed from an operator who may be located at supervisory center 88. It is to be appreciated that while the user interface 16 of FIG. 1 is shown directly associated with microprocessor 18, the system can be arranged to have elements of the user interface, located at the supervisory center 88. Similarly, the LED indicators illustrated in FIG. 3 may also be interconnected in an installation such as FIG. 5 so that they are also located in the supervisory center or at some other convenient location.

As discussed, operation of temperature sensing system A includes power-up sequences, automated calibration, self-testing, and normal operation of the system. Each of these are discussed in more detail in the following paragraphs.

Power Up

Interface unit 12 performs three functions during power up. Initially interface unit 12 displays basic information and begins to provide power to termination unit 14 which begins to charge super-capacitor 74 until sufficient power is stored to allow termination unit 14 to run a self-test. The self-test of termination unit 14 includes alternately activating the electromechanical switches on the unit. Once complete, the termination unit recharges its super-capacitor 74 and sets the termination resistance 26 according to data stored in a local memory of controller 70. Next, a communications/continuity check is performed and termination unit 14 is asked to respond to initial communications from interface unit 12. A short circuit is applied by termination unit 14 to signal communications readiness. The interface unit 12 recognizes the presence of the termination unit 14 and sends a single pulse down temperature sensing cable 10 to verify calibration data stored in the memory of interface unit 12. If the data is verified, interface unit 12 proceeds to normal operation. If not, the calibration routine is executed.

Calibration

Three major objectives are accomplished by system calibration including. matching of temperature sensing cable impedance. setting of proper voltage threshold values, and verification of temperature sensing cable 10 length.

Matching of the cable impedance is accomplished through a voltage level test for each resistance value in the termination unit 14. A resistance value is set by termination unit 14, then voltage comparators 58, 60 alternately measure upper and lower baseline voltage values. The upper comparator 58 is set to a maximum value then stepped down until it intersects a baseline cable reading. The lower comparator 60 is set to zero and stepped up until the baseline signal is crossed. The upper and lower values are then used to form a baseline window measured for each of the resistance values. Selected baseline windows and corresponding resistance values are then stored into the memory of the interface unit 12, and a matching termination resistance 26 is set by termination unit 14 as instructed by interface unit 12.

Values for voltage comparators 58, 60 are then set to levels above and below a baseline window according to programmed values. The set voltages provide sensing window thresholds.

Finally, the length of temperature sensing cable 10 is verified. This is accomplished by interface unit 12 requesting the termination unit 14 to apply a short circuit to the end of cable 10. Then, a measurement of the time interval between pulse application and end of cable reflection is recorded by interface unit 12. Using known propagation constants, the time measurement is converted to a distance and compared to a user input value. The difference between the two distance measurements is stored as a correction factor to be added to future distance event calculations.

Automated Recalibration

Similar to normal calibration, during the automated recalibration a daily check of the baseline window is undertaken. The measured baseline is compared to the initial baseline to check for changes. It is known for example that moisture ingression as well as sub-trigger heating of temperature sensing cable 10 lowers the baseline voltage level. The two conditions are electrically similar and not distinguishable between themselves. Therefore, a drift downward of the baseline window could signify either condition. The system may allow a certain amount of baseline drift over the system life, however, a fault condition is reported as a baseline drift approaches sensing threshold values.

Self Test

System self-test is a series of hardware component tests to verify integrity. The various functional areas of system A are tested and status displayed to a system user. Functional areas include processor, counters, comparators, output circuits, and power supply. Any system malfunction results in fault condition report including description of the failed system components.

Normal Operation

Figure 6A:
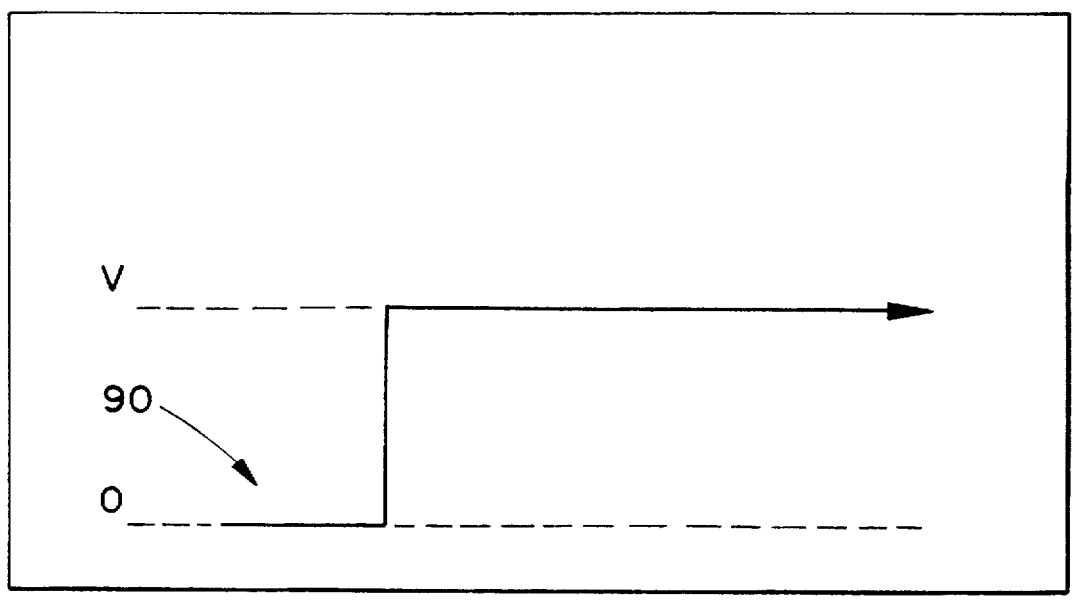
FIGS. 6A–6D are input and output waveforms of the temperature sensing system according to the subject invention.

Two functional phases are incorporated in normal operation, including applying an interrogation signal and a power signal to cable 10. During the interrogation phase, interface unit 14 monitors voltage levels at the pulse output circuit for sensing threshold crossings. If no crossings occur, interface unit 12 applies a 12VDC power signal to the termination unit via the temperature sensing cable 10. The power signal charges the super-capacitor 74 for, approximately 0.9 seconds. Power is then removed from the temperature sensing cable 10 and another interrogation pulse is applied, starting a new cycle. As illustrated in FIG. 6A, when an interrogation pulse 90 is issued, and normal operation exists, i.e. no over-heat condition, there is no pulse reflection.

Further, interface unit 12 sends hourly handshake signals to termination unit 14, which responds with an affirmation signal back to the interface unit 12. Cable baseline values are checked daily to monitor for drift.

The temperature sensing system A also includes supervision capabilities including the undertaking of DC tests and AC tests as further discussed below.

DC Tests

DC voltage is used for continuity check only when a lower threshold crossing is detected. Crossing the lower threshold could be caused by either a heating event, or short circuit. To determine which has occurred, interface unit 12 applies a 12VDC bias on cable 10. It is known that a short circuit requires more current at constant voltage than a heating event. Therefore, interface unit 12 measures the amount of current being used to maintain constant voltage, and if the current is above a predetermined level, a short circuit fault condition is reported, otherwise a heating even alarm is reported.

A system integrity check is accomplished via communications between interface unit 12 and termination unit 14, and is done on an hourly basis to check for proper termination, unit 14 operation as well as cable 10 continuity. If either is compromised, a system fault condition is reported by interface unit 12.

AC Tests

The time domain reflectometry (TDR) is utilized for determination of all possible conditions along the cable. An interrogation pulse 90 is applied to the cable and monitored for changes. The present embodiment of the temperature sensing system A uses a 60 µs wide, 20 ns rise time, 10V amplitude pulse, which is monitored by interface unit 12 for reflections.

The temperature sensing system A of the subject invention also includes fault and alarm conditions as are described below.

Cable Fault (Open Circuit/Short Circuit)

Figure 6B:
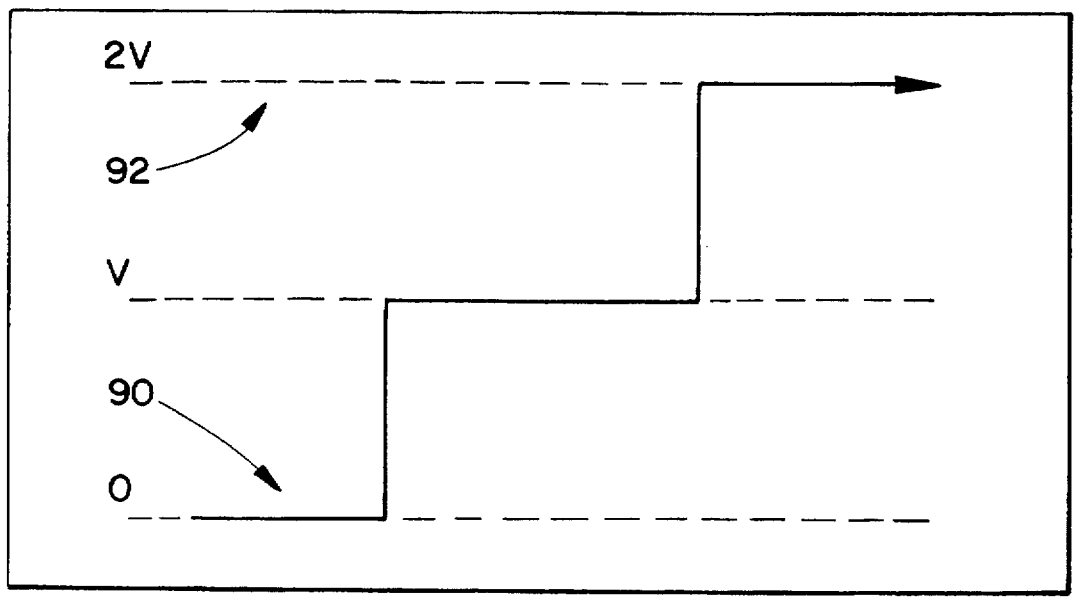

Cable fault conditions such as open/short circuit cause a pulse reflection that changes the shape of the applied interrogation pulse 90. An open circuit condition, or cutting of the cable, creates an area of infinite resistance, causing a positive reflection of the applied interrogation pulse 90. As seen in FIG. 6B, this reflection will cross the upper sensing voltage threshold 92 and trip comparator 58 stopping 12-bit counter 66. An open circuit condition is the only manner in which the upper threshold value is crossed.

Figure 6C:
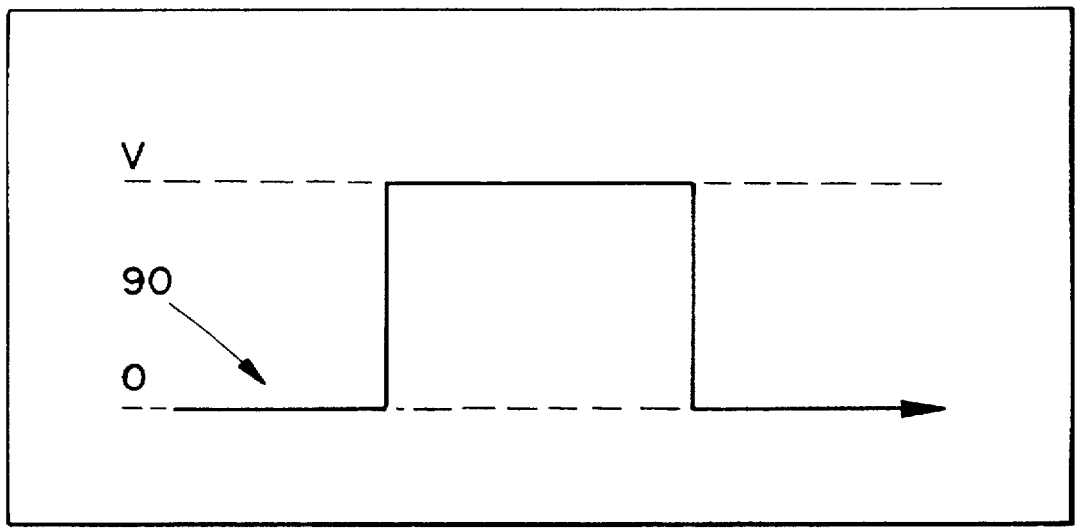
Figure 6D:
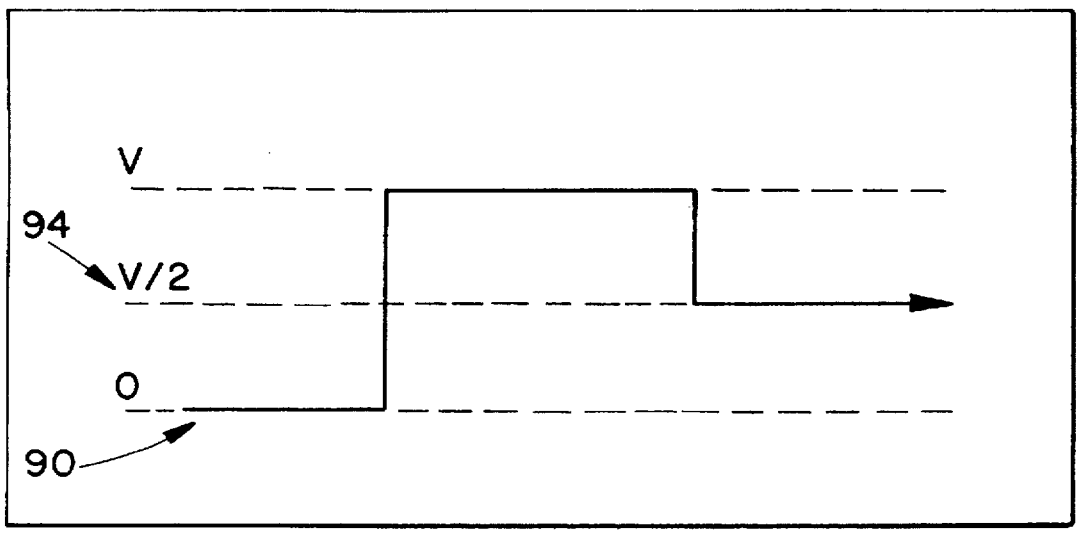

A short circuit, or touching of the two conductors, creates an area of zero resistance, causing a negative reflection of the applied interrogation pulse 90. This condition is sensed when the lower sensing voltage threshold value of comparator 60 is crossed by the negative reflection of the pulse. The two possible causes of a negative reflection are short circuit, as illustrated in FIG. 6C, or a heating event, as illustrated in FIG. 6D. To determine which has occurred, a DC current is applied to cable 10. Voltage resulting from the DC current is measured by the microprocessor 18 and if the voltage is below a certain level 94, a short circuit fault condition exists and if not a heating condition exists.

Verification, Reporting, and Locating

Microprocessor 18 receives an upper comparator 58 trip signal and a timer value (from counter 66). In the present embodiment, verification of the condition is accomplished by waiting for four consecutive/readings to cross the same threshold. After verification is confirmed, the timer value is converted to a distance measurement for reporting. Time to distance conversion is done using physical constants such as propagation delay and transmission loss. Since the upper voltage level is crossed only in an open circuit condition, the interface unit closes the fault condition relay contact, lights the yellow fault condition LED, and reports open circuit condition as well as distance down the cable length to the open circuit condition. Short circuit condition is reported after verification and a DC voltage measurement confirm the condition. Reporting is similar to that of the open circuit condition except that a short circuit condition is reported.

Cable Alarm (Heating Event)

A heating event creates a significant drop in insulation resistance causing a negative reflection of an applied interrogation pulse. This reflection crosses the lower threshold when cable 10 reaches a trigger temperature. Heating events are distinguished from short circuit fault conditions by a DC voltage measurement. Resistance change associated with a heating event is not as great as when caused by a short circuit. If the DC voltage measurement is above a specified level, the interface unit 12 reports a heating event. Alarm contacts are closed, a red LED is lit, and heating event condition information is displayed. The interface unit 12 waits thirty seconds before reporting the distance to the event to allow for possible further decline in the voltage level, which assists in timer measurement accuracy. A final pulse is applied to cable 10 for the time measurement which is used to calculate the distance.

Electronics Fault (No Power, System Malfunction

Contacts in interface unit 12 are designed to close unless power is supplied to hold them open. A no power condition causes both contacts to close, reporting both alarm and fault conditions to the user interface. A system hardware malfunction causes closure of the fault relay contact, lighting of the yellow LED, and text display of the hardware component that has malfunctioned. One such fault is caused when a negative response is received from the termination unit. When this occurs, a "termination fault" message is displayed on the LCD along with the LED and contact closures described above.

The invention has been described with reference to the preferred embodiment. Obviously, modifications and alterations will occur to others upon a reading and understanding of the preceding detailed description. It is intended that the invention be construed as including all such modifications, insofar as they come within the scope of the appended claims or the equivalents thereof.

We claim:

1. A fault detection system comprising:
  a temperature sensing cable;
  an interface unit in operative connection with the temperature sensing cable; and
  a termination unit in operative connection with the temperature sensing cable and the interface unit.

2. The system according to claim 1 wherein the interface unit and the termination unit each have resident intelligence including data processing capabilities and memory storage.

3. The system according to claim 2 wherein the interface unit is configured to generate a power signal which is supplied to the termination unit through the temperature sensing cable.

4. The system according to claim 3 wherein the termination unit further includes a capacitor which is charged by the interface unit.

5. The system according to claim 2 wherein the termination unit further includes a resistor switching network which may be set from a short condition through an open circuit condition.

6. The system according to claim 2 wherein the resident intelligence of the termination unit is a controller configured to control calibration of the system.

7. The system according to claim 2 wherein an interrogation pulse supplied by the interface unit is used in time domain reflectometry.

8. The system according to claim 1 wherein the temperature sensing cable includes a conductor covered with an absorptive material saturated with an eutectic salt forming a substantially cylindrical eutectic salt core around the conductor, and a primary polymer jacket having high moisture barrier characteristics extruded over the outer surface of the eutectic salt core.

9. The system according to claim 8 further including a secondary polymer jacket over the primary polymer jacket.

10. A fault detection system comprising:
  a temperature sensing cable including a conductor covered with an absorptive material saturated with an eutectic salt forming a substantially cylindrical eutectic salt core around the conductor, and a primary polymer jacket having high moisture resistance covering the outer surface of the eutectic salt core;
  an interface unit connected to an end of the temperature sensing cable and configured to generate interrogation pulses to the temperature sensing cable; and
  a termination unit connected to an end of the temperature sensing cable and in communication with the interface unit through the temperature sensing cable.

11. The system according to claim 10 wherein the interface unit is further configured to generate a power signal which is supplied to the termination unit through the temperature sensing cable.

12. The system according to claim 11 wherein the termination unit further includes a power storage capacitor which stores power delivered from the interface unit.

13. The system according to claim 10 wherein the termination unit further includes a resistor network which is settable from a short condition through an open circuit condition.

14. The system according to claim 10 wherein the termination unit includes a controller.

15. The system according to claim 14 wherein the interface unit is configured to perform calibration of the system.

16. The system according to claim 10 wherein the interrogation pulses supplied by the interface unit are used in time domain reflectometry.

17. The system according to claim 10 further including a secondary polymer jacket extruded over the primary polymer jacket.

18. The system according to claim 17 further including an aluminum tape, cigarette wrapped or wound on an outer surface of the primary polymer jacket such that the secondary polymer jacket covers the outer surface of the aluminum tape.

19. The system according to claim 10 wherein the eutectic salt core is formed by at least two distinct layers.

20. The system according to claim 10 wherein the termination unit is configured to differentiate between an interrogation pulse and a power pulse supplied by the interface unit.

* * * * *